United States Patent
Aoyama et al.

(10) Patent No.: US 8,023,470 B2
(45) Date of Patent: Sep. 20, 2011

(54) WIRELESS COMMUNICATION BASE STATION APPARATUS, WIRELESS COMMUNICATION MOBILE STATION APPARATUS, WIRELESS COMMUNICATION METHOD, AND WIRELESS COMMUNICATION SYSTEM

(75) Inventors: Takahisa Aoyama, Kanagawa (JP); Akihiko Nishio, Kanagawa (JP); Akito Fukui, Kanagawa (JP)

(73) Assignee: Panasonic Corporation, Osaka (JP)

( * ) Notice: Subject to any disclaimer, the term of this patent is extended or adjusted under 35 U.S.C. 154(b) by 282 days.

(21) Appl. No.: 12/092,259

(22) PCT Filed: Nov. 2, 2006

(86) PCT No.: PCT/JP2006/322017
§ 371 (c)(1), (2), (4) Date: Apr. 30, 2008

(87) PCT Pub. No.: WO2007/052769
PCT Pub. Date: May 10, 2007

(65) Prior Publication Data
US 2009/0046592 A1 Feb. 19, 2009

(30) Foreign Application Priority Data
Nov. 4, 2005 (JP) ................................ 2005-321448

(51) Int. Cl.
*H04W 4/00* (2009.01)
(52) U.S. Cl. ........................................ 370/331; 370/343
(58) Field of Classification Search .......... 370/329–331, 370/343–344
See application file for complete search history.

(56) References Cited

U.S. PATENT DOCUMENTS

| | | | | |
|---|---|---|---|---|
| 6,542,736 | B1 * | 4/2003 | Parkvall et al. | 455/452.2 |
| 7,573,851 | B2 * | 8/2009 | Xing et al. | 370/334 |
| 7,574,214 | B2 * | 8/2009 | Perets et al. | 455/450 |
| 2004/0203476 | A1 * | 10/2004 | Liu | 455/69 |
| 2006/0209669 | A1 | 9/2006 | Nishio | |

FOREIGN PATENT DOCUMENTS

| | | |
|---|---|---|
| JP | 2004-135305 | 4/2004 |
| JP | 2005-005781 | 1/2005 |
| WO | 2005/020488 | 3/2005 |
| WO | 2005/096522 | 10/2005 |

OTHER PUBLICATIONS

3GPP TSG RAN WG1 Ad Hoc on LTE, "Downlink Channelization and Multiplexing for EUTRA," R1-050604, Jun. 2005, pp. 1-9.

* cited by examiner

*Primary Examiner* — Phuc Tran
(74) *Attorney, Agent, or Firm* — Dickinson Wright PLLC

(57) ABSTRACT

A wireless communication method and a wireless communication system wherein any communication interruption caused by changing RRB arrangement information can be avoided. In ST301, Node B (100) transmits informative information including the RRB arrangement information and RRB arrangement version. In ST302, UE (200) holds the RRB arrangement information and RRB arrangement version included in the informative information received from Node B (100). In ST303, UE (200) creates CQI information including both a CQI report value, which is calculated by use of the held RRB arrangement information, and the held RRB arrangement version. In ST304, UE (200) transmits the CQI information to Node B (100). In ST305, Node B (100) performs a scheduling based on the RRB arrangement information determined from the RRB arrangement version included in the received CQI information. In ST306, Node B (100) transmits the scheduling information to UE (200).

2 Claims, 9 Drawing Sheets

```
Broadcast message
{Value tag = 3
    Block1 = Sub-carrier 1, 9, 20, 31,
    Block2 = Sub-carrier 2, 10, 21, 32,
        ...
    Block30 = Sub-carrier 297-300,    }
```

WIRELESS COMMUNICATION BASE STATION APPARATUS, WIRELESS COMMUNICATION MOBILE STATION APPARATUS, WIRELESS COMMUNICATION METHOD, AND WIRELESS COMMUNICATION SYSTEM

TECHNICAL FIELD

The present invention relates to a wireless communication base station apparatus, wireless communication mobile station apparatus, wireless communication method and wireless communication system that use a localized channel and distributed channel in the OFDM (Orthogonal Frequency Division Multiplex) system.

BACKGROUND ART

In recent years, in LTE (Long Term Evolution), carrying out channel definition in the physical layer according to scheduling differences is studied. As specific examples of this channel definition, there are channels such as the localized channel and the distributed channel based on the OFDM system.

FIG. 1 is a conceptual diagram of the localized channel and the distributed channel in the frequency domain. In FIG. 1, blocks 1, 2 and 3 show the distributed channel and blocks 4, 5, 6, . . . , 29 and 30 show the localized channel. Further, in this figure, three subcarriers are assigned to one block of the localized channel. Hereinafter, this block will be referred to as "RRB (Radio Resource Block)."

The localized channel refers to a method of assigning RRB's to users in the frequency domain and the time domain in a concentrated manner, and is directed to improving throughput by scheduling by assigning only RRB's of good received quality to users. Further, the operation of UE's includes measuring received power per RRB (in FIG. 1, blocks 4, 5, 6, 29, and 30) which is arranged in the localized channel, and calculating and reporting the CQI of each RRB, and Node B reports the scheduling result to UE's using RRB numbers.

On the other hand, the distributed channel refers to assigning RRB's in the frequency domain and the time domain in a distributed manner, and is directed to providing stable quality to users by obtaining frequency and time diversity. Further, the operation of UE's include calculating and reporting the CQI based on average full band received power, and Node B reports the scheduling result to UE's using RRB numbers.

In this way, first, UE's report the CQI's in RRB units (in the case of the localized channel) and are assigned schedulings in RRB units, and so need to learn how RRB's are arranged, that is, learn RRB arrangement information.

Next, the characteristics of the localized channel and the distributed channel will be described. The localized channel assigns high quality frequency band and time to users, and so high speed communication can be anticipated. Further, the localized channel needs to report the CQI's per RRB frequently, and, for this reason, cannot be applied to UE's which receive significant fading variation. In view of these, the localized channel is suitable for massive downloading services such as web browsing and is preferably used for users who are not moving at a high speed.

On the other hand, with the distributed channel, high speed communication cannot be anticipated but frequency diversity and time diversity can be obtained, so that stable communication can be anticipated. Further, the frequency of CQI report can be reduced compared to the localized channel. For this reason, the distributed channel does not carry out high speed transmission, but is suitable for services such as speech requiring stable quality, and so is preferably used for users when scheduling functions do not work effectively because users move fast.

In this way, uses are different between channels. For this reason, if the arrangement of the localized channel and the distributed channel is fixed, the distributed channel is likely to be assigned to users originally suitable for the localized channel, or, on the other hand, the localized channel is likely to be assigned to users originally suitable for the distributed channel. Therefore, the arrangement of the localized channel and the distributed channel is preferably variable.

The arrangement pattern of the localized channel and the distributed channel may be changed, for example, in the case where, for UE's in the same cell, the distributed channel is assigned to 20% of the UE's and the localized channel is assigned to the rest of 80% of the UE's (which is shown in the upper part of FIG. 2), and, in the case where the distributed channel is assigned to 10% of the UE's and the localized channel is assigned to the rest of 90% of the UE's (which is shown in the lower part of FIG. 2).

Non-Patent Document 1: "Downlink Channelization and Multiplexing for EUTRA," Samsung, 3GPP TSG RAN WG1 Ad Hoc on LTE, R1-050604, Sophia Antipolis, France, Jun. 20 to 21, 2005.

Non-Patent Document 2: "Radio Resource Control (RRC) Protocol Specification," 3GPP TR25.331

DISCLOSURE OF INVENTION

Problems to be Solved by the Invention

There are following cases for RRB arrangement patterns. (1) The arrangement pattern is common between users, and there is only one arrangement pattern in the cell. (2) The arrangement pattern is common between users, but there are a plurality of arrangement patterns in the cell. (3) There are different arrangement patterns on a per user basis.

How resources are assigned to a plurality of users is determined in scheduling, so that, if the RRB arrangement is common between users, it is easy for Node B to carry out scheduling.

Assuming this case, RRB arrangement information is common between users, and so is effectively transmitted using broadcast information. Further, the arrangement of the localized channel and the distributed channel is likely to be changed. FIG. 3 shows the operation of transmitting RRB arrangement information using broadcast information and changing this content halfway. In this case, Node B is assumed to report broadcast information on a regular basis, and UE1, UE2 and UE3 are assumed to be provided as UE's and receive broadcast information at respective timings (because broadcast information is basically not received at all times and receiving timings are managed by UE's according to, for example, timer management).

In FIG. 3, in ST11, Node B reports RRB arrangement information 1 and, in ST12, switches the arrangement information from RRB arrangement information 1 to RRB arrangement information 2 and transmits that information. Here, UE1 is not at the receiving timing for broadcast information, UE2 is at the receiving timing for broadcast information but nevertheless fails to receive broadcast information, and UE3 is at the receiving timing and successfully receives broadcast information. In this case, UE3 receives RRB arrangement information 2 and so reports the CQI based on arrangement information 2.

On the other hand, UE 1 and UE 2 report the CQI's based on RRB arrangement information 1. Here, Node B decides the CQI's transmitted from the UE's using new RRB arrangement information 2 and carries out scheduling. For this reason, scheduling can be carried out adequately for UE 3 but cannot be carried out adequately for UE 1 and UE 2.

To be more specific, one example of RRB arrangement information 1 and RRB arrangement information 2 will be described using FIG. 4. Assume that UE 1 reports that received quality of block 7 (subcarriers 7 to 9) is good, using RRB arrangement information 1. In this case, Node B assigns block 7 (subcarriers 16 to 18) of new RRB arrangement information 2 to UE 1 and reports the result as scheduling information. As a result, UE 1 waits for subcarriers 7 to 9 and Node B waits for subcarriers 16 to 18, and so communication is disabled.

It is therefore an object of the present invention to provide a wireless communication base station apparatus, wireless communication mobile station apparatus, wireless communication method and wireless communication system that prevent communication cutoff when RRB arrangement information changes.

Means for Solving the Problem

The wireless communication base station apparatus according to the present invention employs a configuration including: a managing section that manages arrangement information showing an arrangement of a distributed channel where frequency and time are assigned in a distributed manner and a localized channel where frequency and time are assigned in a concentrated manner, and an arrangement version as an index of the arrangement information; a broadcast information creating section that creates broadcast information including the arrangement information and the arrangement version every time the arrangement information changes; and a transmitting section that transmits the broadcast information.

The wireless communication mobile station apparatus according to the present invention employs a configuration including: a receiving section that receives broadcast information including arrangement information showing an arrangement of a distributed channel where which frequency and time are assigned in a distributed manner and a localized channel where frequency and time are assigned in a concentrated manner and an arrangement version as an index of the arrangement information; a channel quality indicator report value calculating section that calculates a channel quality indicator report value based on the arrangement information; a channel quality indicator information creating section that creates channel quality indicator information including the channel quality indicator report value and the arrangement version; and a transmitting section that transmits the channel quality indicator information.

Advantageous Effect of the Invention

According to the present invention, it is possible to prevent communication cutoff when RRB arrangement information changes.

BEST MODE FOR CARRYING OUT THE INVENTION

Figure 1:
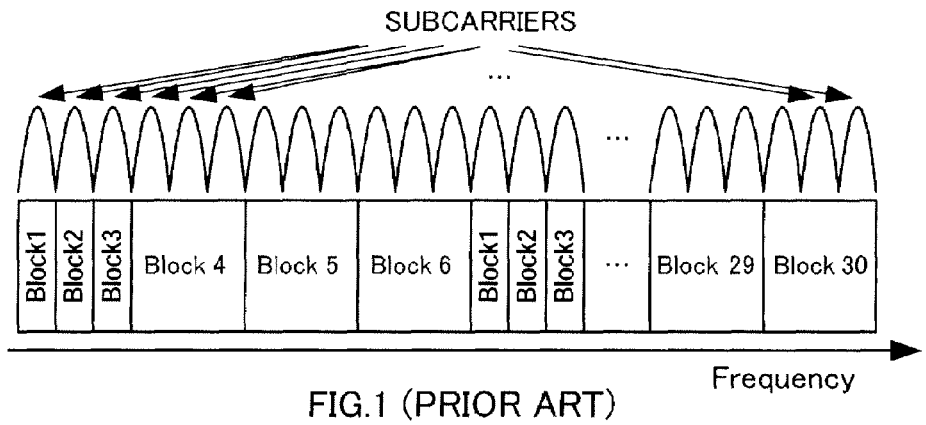
FIG. 1 is a conceptual diagram of the localized channel and the distributed channel.
Figure 2:
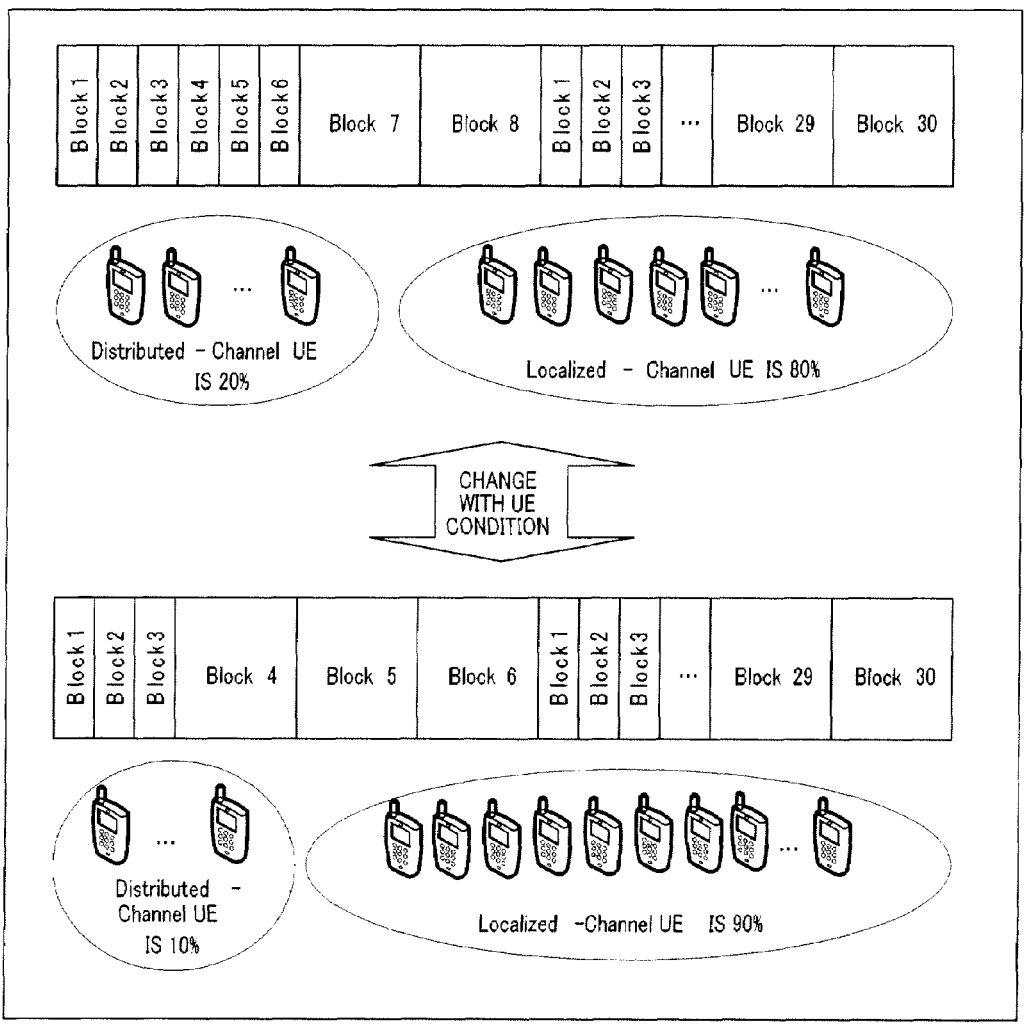
FIG. 2 illustrates that an arrangement of the localized channel and the distributed channel is variable.
Figure 3:
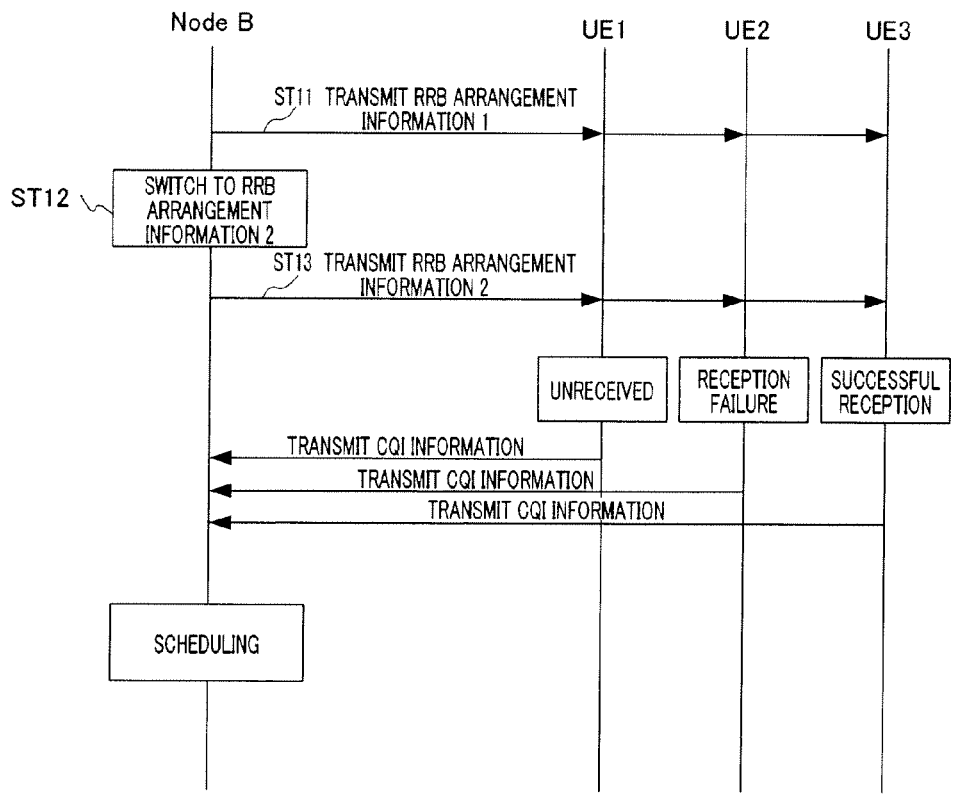
FIG. 3 illustrates a method of changing RRB arrangement information.
Figure 4:
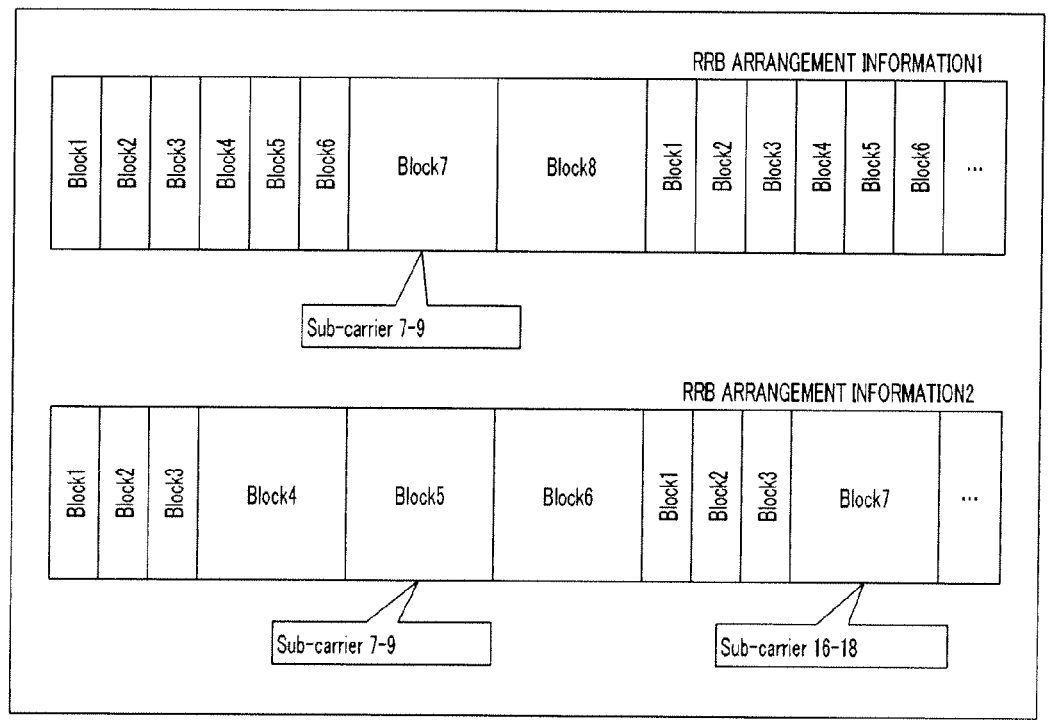
FIG. 4 shows one example of RRB arrangement information 1 and RRB arrangement information 2.

Hereinafter, embodiments of the present invention will be described with reference to the accompanying drawings. However, in embodiments, the configurations with the same functions will be assigned the same reference numerals and repetition of description will be omitted.

Embodiment 1

Figure 5:
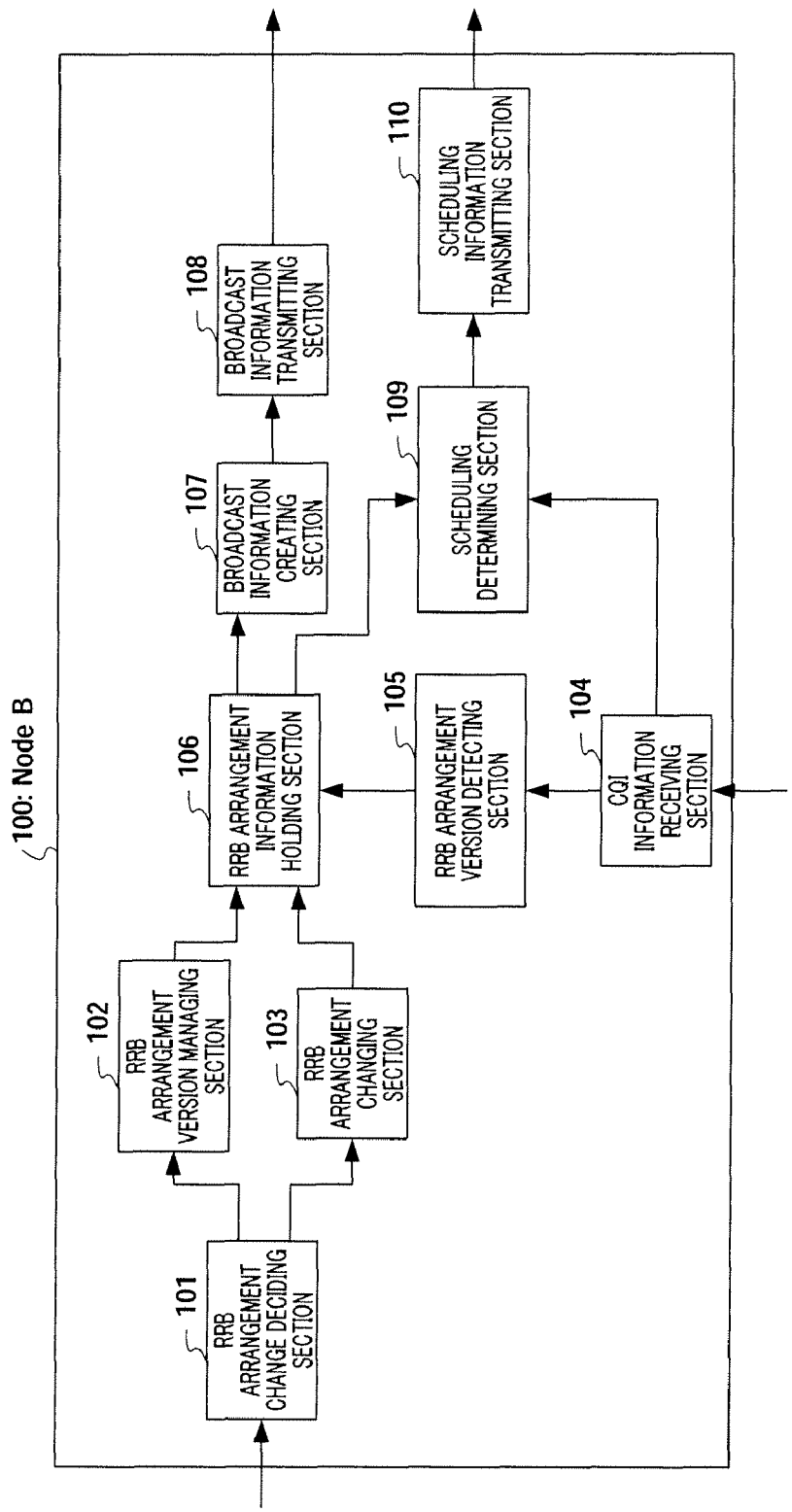
FIG. 5 is a block diagram showing a configuration of Node B according to Embodiment 1 of the present invention.

FIG. 5 is a block diagram showing a configuration of Node B 100 according to Embodiment 1 of the present invention. In this figure, out of UE's under Node B control, RRB arrangement change deciding section 101 decides whether or not to change the RRB arrangement based on, for example, the ratio of the UE's to which the localized channel is applied, and the UE's to which the distributed channel is applied. If RRB arrangement change deciding section 101 decides to change the RRB arrangement, RRB arrangement change information deciding section 101 reports the decision result showing this decision to RRB arrangement version managing section 102 and RRB arrangement changing section 103. If RRB arrangement change deciding section 101 decides to change the RRB arrangement, RRB arrangement change deciding section 101 reports, for example, the changed ratio of the UE's to which the localized channel is applied, and the UE's to which the distributed channel is applied, with the decision result. Further, if RRB arrangement change deciding section 101 decides not to change the RRB arrangement, RRB arrangement change deciding section 101 outputs no report to RRB arrangement version managing section 102 and RRB arrangement changing section 103.

RRB arrangement version managing section 102 manages an RRB arrangement version as an index of arrangement information. To be more specific, RRB arrangement version managing section 102 acquires the result of deciding to change the RRB arrangement from RRC arrangement change deciding section 101 and increments the RRB arrangement version currently managed. Then, RRB arrangement version managing section 102 makes the incremented RRB arrangement version the RRB arrangement version currently managed, and outputs the incremented RRB arrangement version to RRB arrangement information holding section 106.

RRB arrangement changing section 103 acquires the result of deciding to change the RRB arrangement, from RRB arrangement change deciding section 101, acquires together with the decision result the changed ratio of the UE's, to which the localized channel is applied, and the UE's, to which the distributed channel is applied, and changes the specific arrangement of RRB's based on the acquired changed ratio. The changed new RRB arrangement information is outputted to RRB arrangement information holding section 106. Further, specific RRB arrangement refers to specifying the assigning channel and subcarriers on a per block basis. For example, the localized channel and subcarriers 1 to 3 are assigned to block 1.

CQI information receiving section 104 receives CQI information including the RRB arrangement version used by a UE, which will be described later, and a CQI report value, outputs the RRB arrangement version included in the received CQI information to RRB arrangement version detecting section 105 and outputs the RRB arrangement version and the CQI report value to scheduling determining section 109.

RRB arrangement version detecting section 105 detects the RRB arrangement version outputted from CQI information receiving section 104, and outputs the detected RRB arrangement version to RRB arrangement information holding section 106.

RRB arrangement information holding section 106 holds the RRB arrangement information outputted from RRB arrangement changing section 103 in association with the RRB arrangement version outputted from RRB arrangement version managing section 102, and outputs the latest RRB arrangement information held and RRB arrangement version to broadcast information creating section 107 according to a regular change period of broadcast information. Further, RRB arrangement information holding section 106 outputs RRB arrangement information corresponding to the RRB arrangement version outputted from RRB arrangement version detecting section 105, to scheduling determining section 109.

Broadcast information creating section 107 creates broadcast information including the RRB arrangement information and RRB arrangement version outputted from RRB arrangement information holding section 106, and outputs the created broadcast information to broadcast information transmitting section 108. Broadcast information transmitting section 108 transmits the broadcast information outputted from broadcast information creating section 107 to the UE's which will be described later.

Scheduling determining section 109 carries out scheduling for UE's, that are transmission sources of CQI information, based on the RRB arrangement version and CQI report value outputted from CQI information receiving section 104 and the RRB arrangement information outputted from RRB arrangement information holding section 106, and outputs scheduling information to scheduling information transmitting section 110.

In practice, scheduling operation refers to selecting the optimum UE's from a plurality of UE's, but a case of one UE will be described here for ease of description. Although this scheduling operation may refer to simply selecting UE's of good quality or carrying out scheduling taking into account the QoS of UE's, any scheduling method may be employed.

Scheduling information transmitting section 110 transmits the scheduling information outputted from scheduling determining section 109 to the UE's that are the transmission sources of CQI information.

Figure 6:
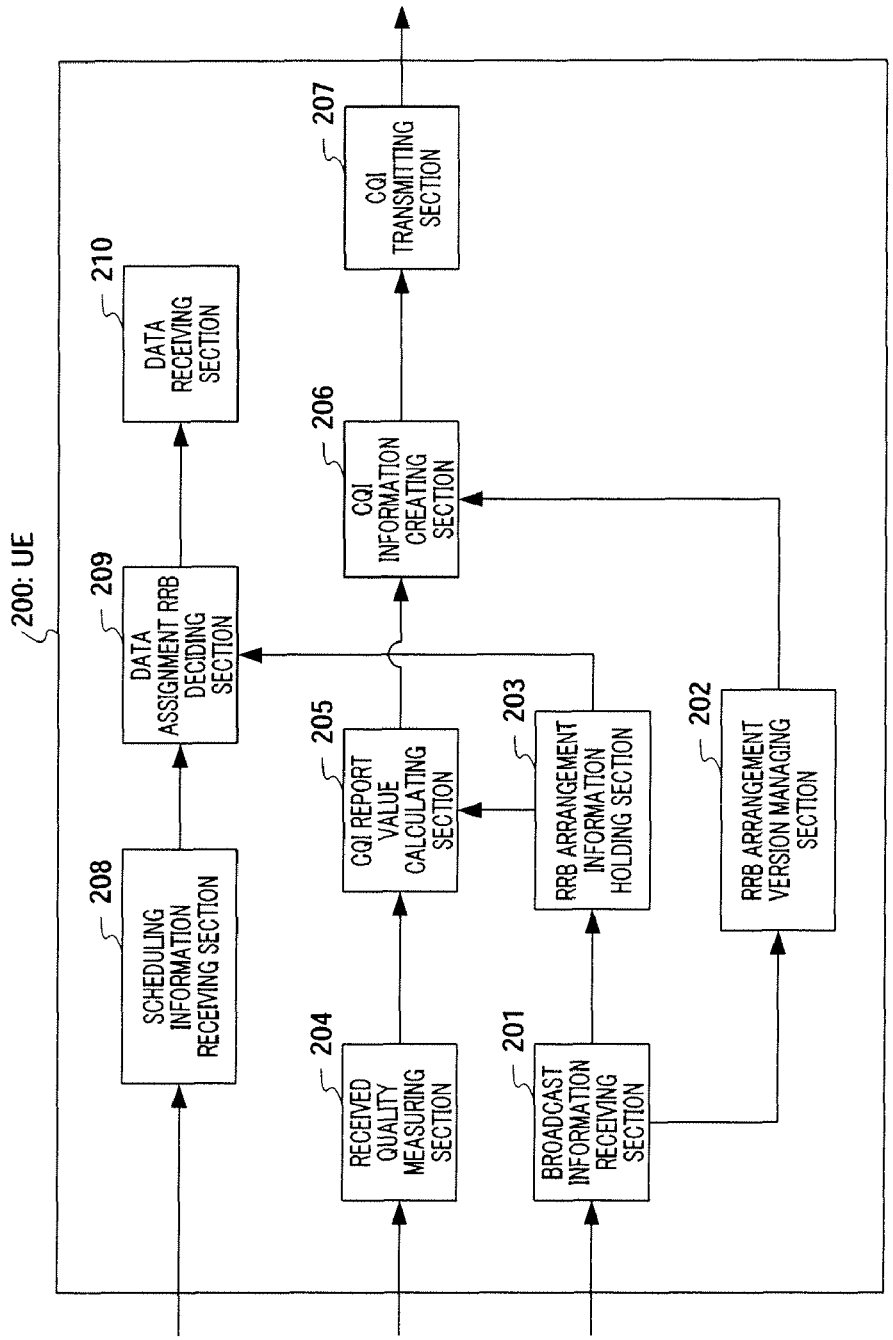
FIG. 6 is a block diagram showing a configuration of UE's according to Embodiment 1 of the present invention.

FIG. 6 is a block diagram showing a configuration of UE 200 according to Embodiment 1 of the present invention. In this figure, broadcast information receiving section 201 receives the broadcast information transmitted from Node B 100 shown in FIG. 5, outputs the RRB arrangement information included in the received broadcast information to RRB arrangement information holding section 203 and outputs the RRB arrangement version included in the same received broadcast information to RRB arrangement version managing section 202.

RRB arrangement version managing section 202 manages the RRB arrangement version outputted from broadcast information receiving section 201 and outputs the managed RRB arrangement version to CQI information creating section 206.

RRB arrangement information holding section 203 holds the RRB arrangement information outputted from broadcast information receiving section 201 and outputs the held RRB arrangement information to CQI report value calculating section 205 and data assignment RRB deciding section 209.

Received quality measuring section 204 measures received quality of each subcarrier transmitted from Node B 100 shown in FIG. 5 and outputs the measured received quality to CQI report value calculating section 205. In this case, received quality measurement is likely to be carried out using the pilot signal included in each subcarrier, but is not limited to this.

CQI report value calculating section 205 converts received quality of each subcarrier outputted from received quality measuring section 204 into received quality of each RRB based on RRB arrangement information outputted from RRB arrangement information holding section 203, and calculates the CQI report value of each RRB based on received quality of each RRB. The calculated CQI report value is outputted to CQI information creating section 206. Further, when the distributed channel is used, the average full band value is likely to be used instead of the CQI report value of each RRB, and so the CQI report values with respect to the full band are calculated. Here, any method is used as the CQI report value calculation method.

Further, although, in this case, RRB arrangement information is outputted from RRB arrangement information holding section 203 to CQI report value calculating section 205, when RRB arrangement information is outputted to received quality measuring section 204 and received quality measuring section 204 measures received quality, received quality may be measured based on the RRB arrangement information.

CQI information creating section 206 creates CQI information including the RRB arrangement version outputted from RRB arrangement version managing section 202 and the CQI report value outputted from CQI report value calculating section 205, and outputs the created CQI information to CQI transmitting section 207. The CQI information format may include the CQI report value on a per block basis, for example, "block 1 for CQI 3, and block 2 for CQI 1 . . . " and store the RRB arrangement version together with this CQI report value. CQI transmitting section 207 transmits the CQI information outputted from CQI information creating section 206 to Node B 100 shown in FIG. 5.

Scheduling information receiving section 208 receives scheduling information transmitted from Node B 100 shown in FIG. 5 and decides whether or not data for this UE is scheduled based on the received scheduling information. If data for this UE is scheduled, a block assigned data for this UE is outputted to data assignment RRB deciding section 209.

Data assignment RRB deciding section 209 decides which subcarriers the block outputted from scheduling information receiving section 208 matches with, based on the RRB arrangement information outputted from RRB arrangement information holding section 203. That is, data assignment RRB deciding section 209 decides which subcarriers transmit data for this UE. Information of the decided subcarriers is outputted to data receiving section 210.

Data receiving section 210 receives data for this UE transmitted by these subcarriers according to the subcarrier information outputted from data assignment RRB deciding section 209.

Figures 7, 8:
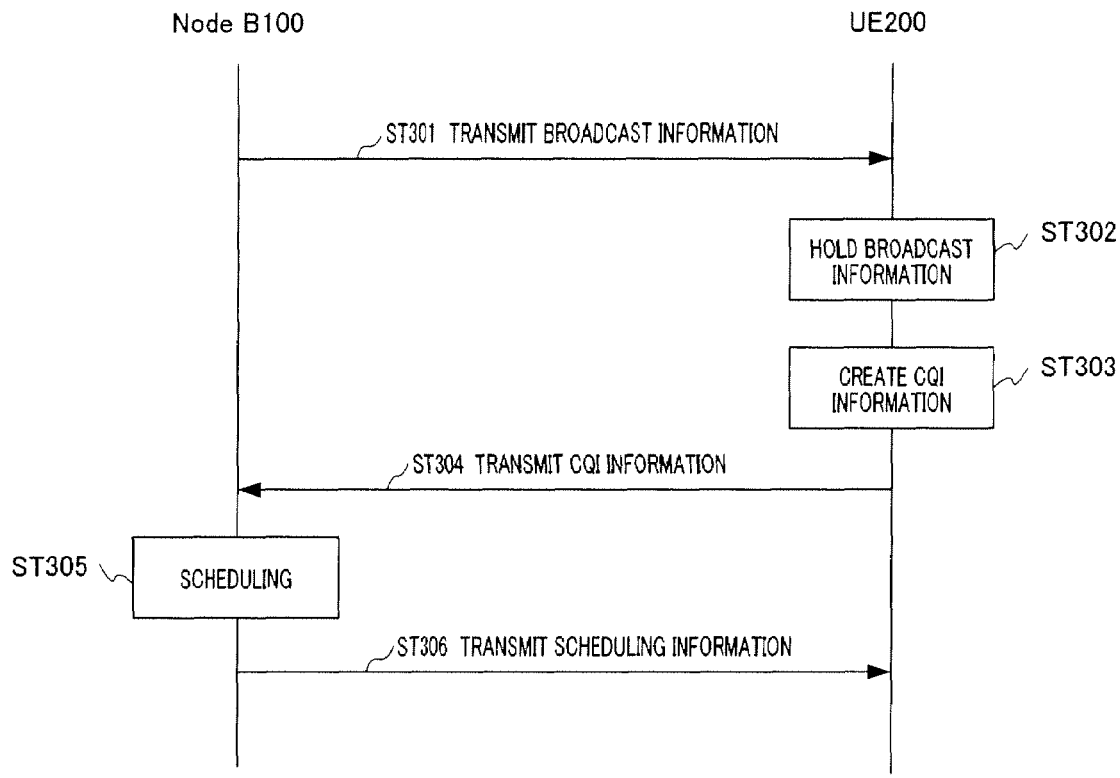
FIG. 7 is a sequence diagram showing communication steps between Node B shown in FIG. 5 and UE's shown in FIG. 6.
FIG. 8 shows RRB arrangement information and an RRB arrangement version included in broadcast information.

Next, communication steps between Node B 100 shown in FIG. 5 and UE 200 shown in FIG. 6 will be described using FIG. 7. In FIG. 7, in step (hereinafter "ST") 301, Node B 100 transmits broadcast information including the RRB arrangement version (i.e. value tag) together with RRB arrangement information, to UE 200. As shown in FIG. 8, the broadcast information includes the value tag and subcarrier information assigned on a per block basis. Here, the RRB arrangement version is value tag=3.

In ST302, UE 200 receives the broadcast information from Node B 100 and holds the RRB arrangement information and RRB arrangement version included in the received broadcast information.

In ST303, the CQI report value is calculated using the RRB arrangement information held in ST 302, and CQI information including the calculated CQI report value and the RRB arrangement version (i.e. value tag=3) held in ST302 is created. In ST304, UE 200 transmits the CQI information to Node B 100.

In ST305, Node B 100 receives the CQI information from UE 200, decides the RRB arrangement information used by UE 200 based on the RRB arrangement version included in the received CQI information and carries out scheduling based on the decided RRB arrangement information. In ST306, Node B 100 transmits scheduling information to UE 200.

However, if UE 200 is not able to receive new broadcast information yet, CQI information including an old RRB arrangement version (for example, value tag=2) is transmitted to Node B 100. In this case, Node B 100 is able to carry out scheduling using an old RRB arrangement (for example, the arrangement specified by value tag=2).

Although a case has been described where scheduling information does not include information showing the RRB arrangement, it is possible to include the RRB arrangement version in the scheduling information to support cases where the RRB arrangement used is expressly shown to UE 200 and where UE 200 uses the different RRB arrangement from the RRB arrangement specified by CQI information. In this case, data assignment RRB deciding section 209 needs to learn the RRB arrangement from the RRB arrangement version specified by Node B 100.

Figure 9:
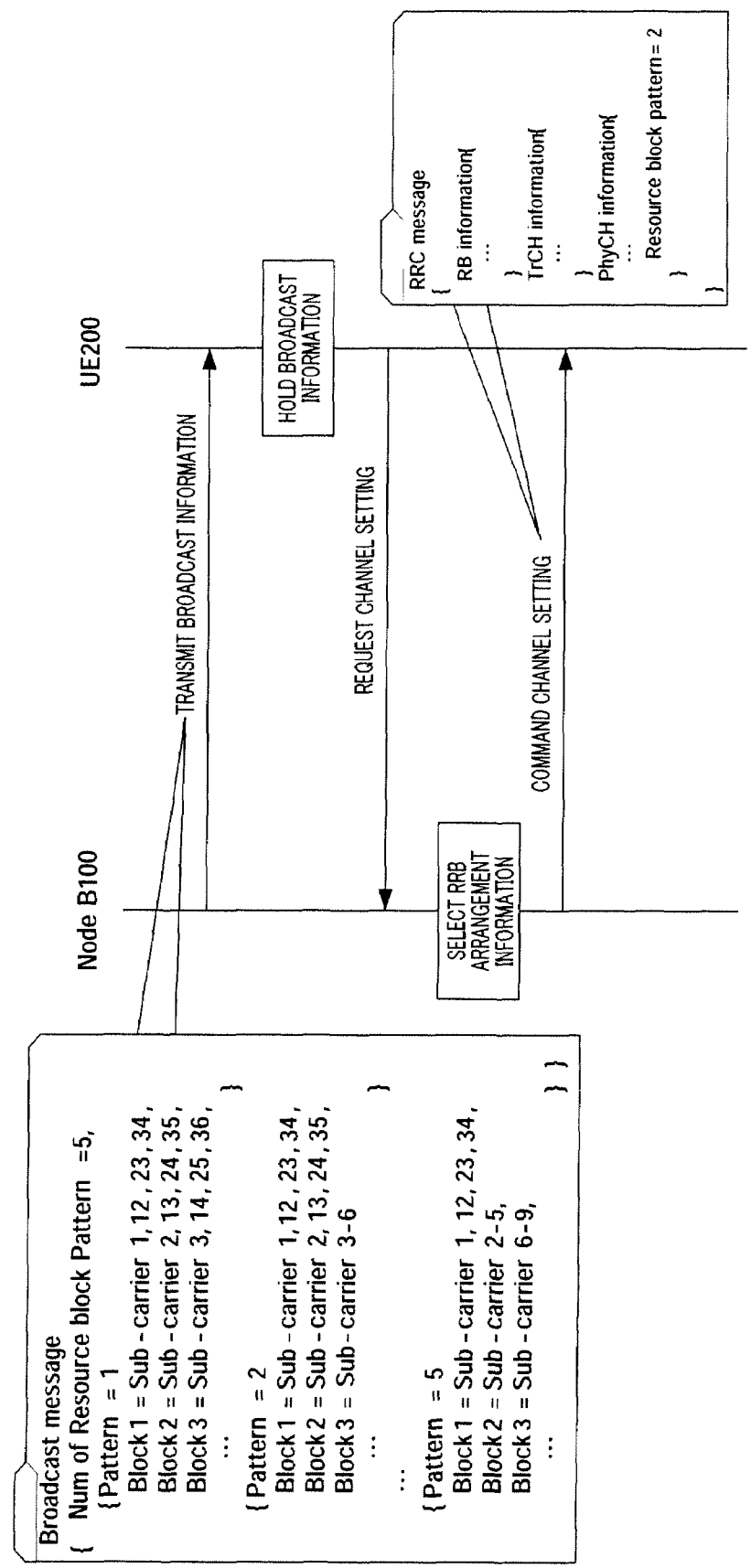
FIG. 9 illustrates that a plurality of RRB arrangement information is reported using broadcast information.

Further, although only one RRB arrangement information (i.e. pattern) is shown per broadcast information, a plurality of patterns may be shown per broadcast information. For example, methods of reporting a plurality of patterns (patterns 1 to 5) as shown in FIG. 9, and selecting a pattern for use in Node B 100 or selecting a pattern for use in UE 200 at random when a channel is actually assigned to UE 200, may be possible. In this case, by reporting which pattern is used using CQI information, Node B 100 is able to check the pattern used by UE 200.

Further, although information showing aversion, Value Tag, as information showing the RRB arrangement, information directly showing arrangement information instead of a version may be used.

Further, RRB arrangement information assumes to be information per cell, and so it is necessary to re-read RRB arrangement information after carrying out handover. For this reason, it may be possible to eliminate the necessity to re-read RRB arrangement information by providing a means for transmitting RRB arrangement information of adjacent cells in broadcast information or including RRB arrangement information of adjacent cells in a message commanding handover. Further, it is assumed that, before carrying out handover, received quality information with respect to other cells is transmitted from UE 200 to Node B 100. In this case, by holding RRB arrangement information of other cells or reporting the version held, it may be possible to report RRB arrangement information of UE's in other cells.

According to Embodiment 1, an UE, which receives RRB arrangement information together with broadcast information including an RRB arrangement version as an index of the RRB arrangement information, transmits CQI information including the CQI report value calculated based on the RRB arrangement information included in the broadcast information and the RRB arrangement version, to Node B, and Node B is able to recognize the RRB arrangement information used by the UE and carries out scheduling based on the RRB arrangement information used by the UE, so that it is possible to prevent communication cutoff even when RRB arrangement information changes.

Embodiment 2

Figure 10:
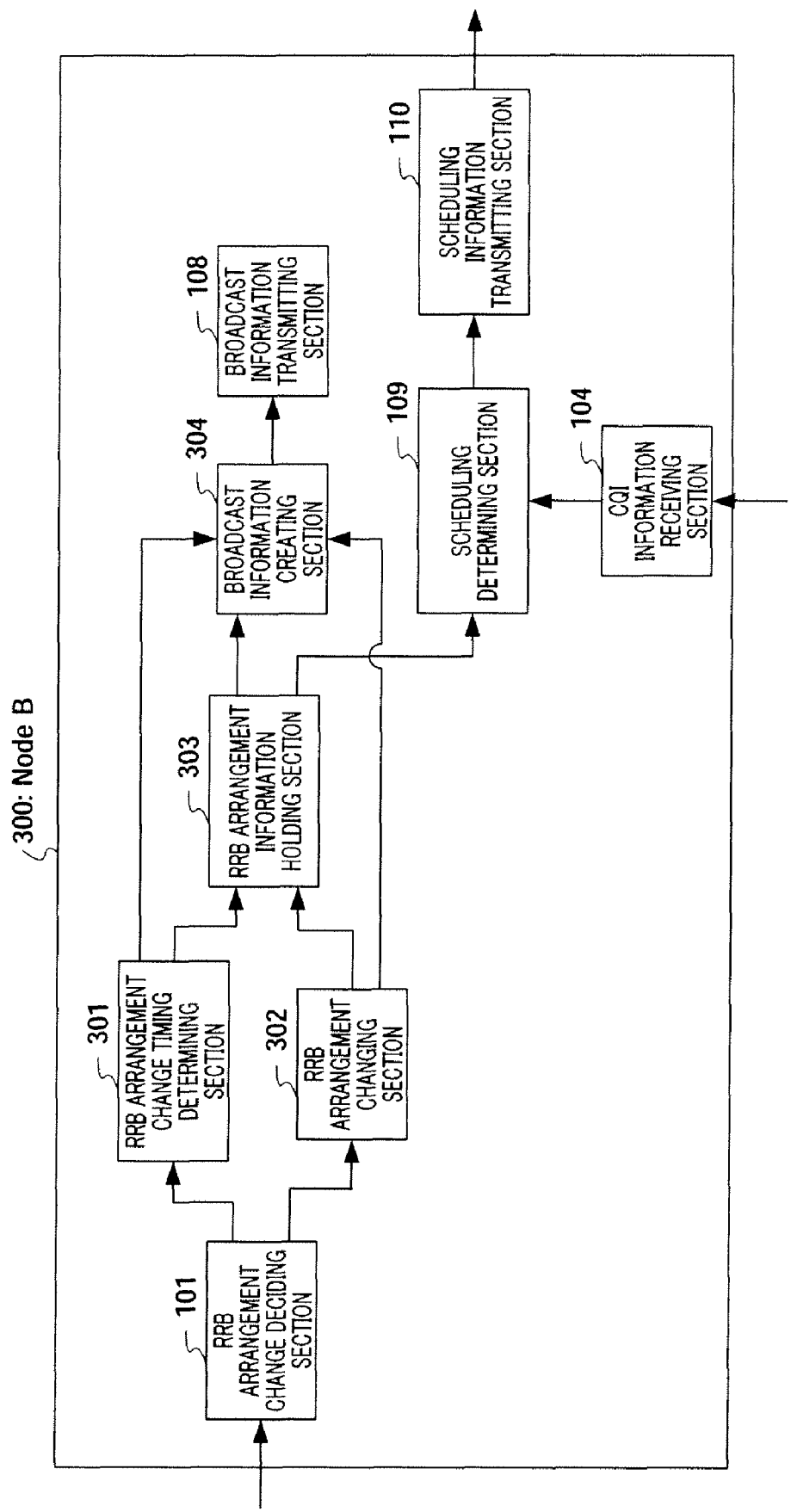
FIG. 10 is a block diagram showing a configuration of Node B according to Embodiment 2 of the present invention.

FIG. 10 is a block diagram showing a configuration of Node B according to Embodiment 2 of the present invention. FIG. 10 differs from FIG. 5 in removing RRB arrangement version detecting section 105, changing RRB arrangement version managing section 102 to RRB arrangement change timing determining section 301, changing RRB arrangement changing section 103 to RRB arrangement changing section 302, changing RRB arrangement information holding section 106 to RRB arrangement information holding section 303 and changing broadcast information creating section 107 to broadcast information creating section 304.

In FIG. 10, RRB arrangement change timing determining section 301 acquires a result of deciding to change the RRB arrangement, from RRB arrangement change deciding section 101 and determines the timing to change RRB arrangement information. Information of the determined timing is outputted to RRB arrangement information holding section 303 and broadcast information creating section 304. Further, for example, frame numbers among SFN (Super Frame Number) in the UMTS (Universal Mobile Telecommunications System) are used as timing information.

RRB arrangement changing section 302 acquires the decision result showing that RRB arrangement changes, from RRB arrangement change deciding section 101, acquires the changed ratio of the UE's, to which the localized channel is applied, and the UE's, to which the distributed channel is applied, and change the specific arrangement of RRB's based on the changed ratio acquired. The new changed RRB arrangement information is outputted to RRB arrangement information holding section 303 and broadcast information creating section 304.

RRB arrangement information holding section 303 holds RRB arrangement information currently used, and writes the RRB arrangement information outputted from RRB arrangement changing section 302 over RRB arrangement information currently held, at the timing outputted from RRB arrangement change timing determining section 301. The overwritten RRB arrangement information is outputted to broadcast information creating section 304.

Broadcast information creating section 304 creates broadcast information including current RRB arrangement information outputted from RRB arrangement information holding section 303. Further, when timing information and new RRB arrangement information are outputted from RRB arrangement change timing determining section 301 and RRB arrangement changing section 302, respectively, broadcast information creating section 304 creates broadcast information including these information in addition to the current RRB arrangement information. The created broadcast information is outputted to broadcast information transmitting section 108.

Figure 11:
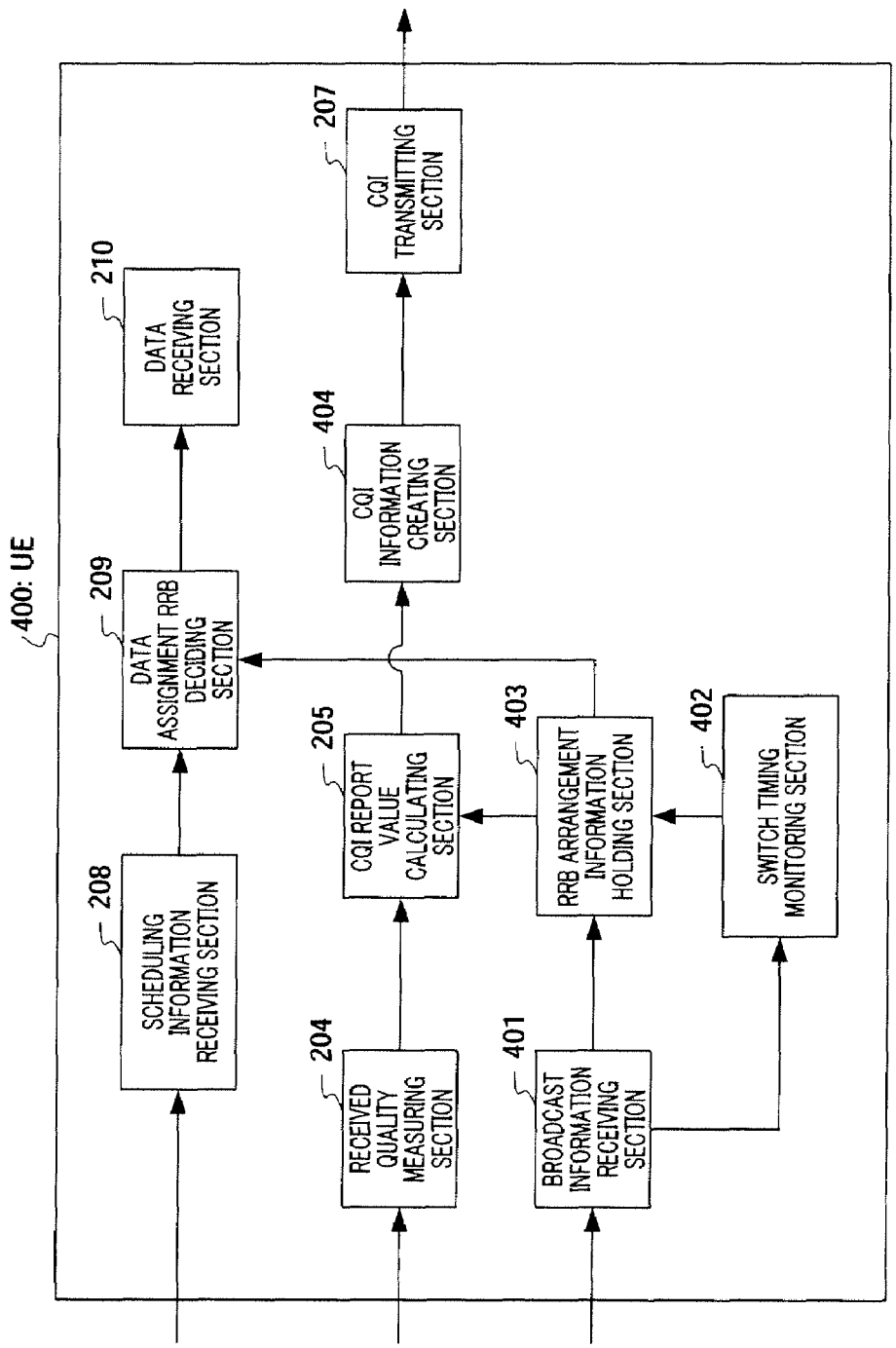
FIG. 11 is a block diagram showing a configuration of UE's according to Embodiment 2 of the present invention.

FIG. 11 is a block diagram showing a configuration of UE 400 according to Embodiment 2 of the present invention. FIG. 11 differs from FIG. 6 in changing broadcast information receiving section 201 to broadcast information receiving section 401, changing RRB arrangement version managing section 202 to switch timing monitoring section 402, changing RRB arrangement information holding section 203 to RRB arrangement information holding section 403 and changing CQI information creating section 206 to CQI information creating section 404.

Broadcast information receiving section 401 receives the broadcast information transmitted from Node B 300 shown in FIG. 10, and outputs the RRB arrangement information included in the received broadcast information to RRB arrangement information holding section 403. When new RRB arrangement information and timing information are included in the broadcast information, broadcast information receiving section 401 also outputs the new RRB arrangement information to RRB arrangement information holding section 403 and outputs the timing information to switch timing monitoring section 402.

Switch timing monitoring section 402 counts the number of switch timings for RRB arrangement information based on the timing information outputted from broadcast information receiving section 401, and outputs a command to switch RRB arrangement information at a switch timing to RRB arrangement information holding section 403. RRB arrangement information holding section 403 holds the RRB arrangement information outputted from broadcast information receiving section 401. Further, when new RRB arrangement information is outputted from broadcast information receiving section 401, RRB arrangement information holding section 403 changes the RRB arrangement information for use to the new RRB arrangement information according to the switching command outputted from switch timing monitoring section 402. RRB arrangement information holding section 403 outputs the RRB arrangement information for current use to CQI report value calculating section 205 and data assignment RRB deciding section 209.

CQI information creating section 404 creates CQI information including the CQI report value outputted from CQI report value calculating section 205 and outputs the created CQI information to CQI transmitting section 207.

Figure 12:
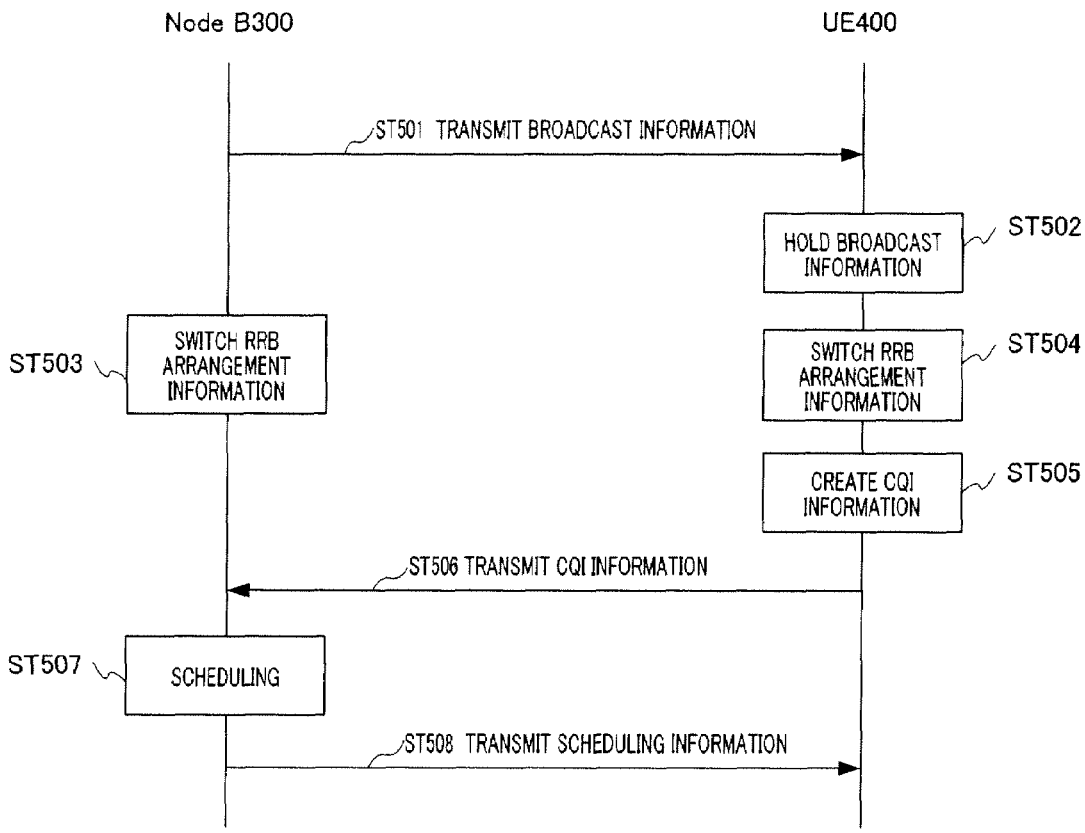
FIG. 12 is a sequence diagram showing communication steps between Node B shown in FIG. 10 and UE's shown in FIG. 11.
Figure 13:
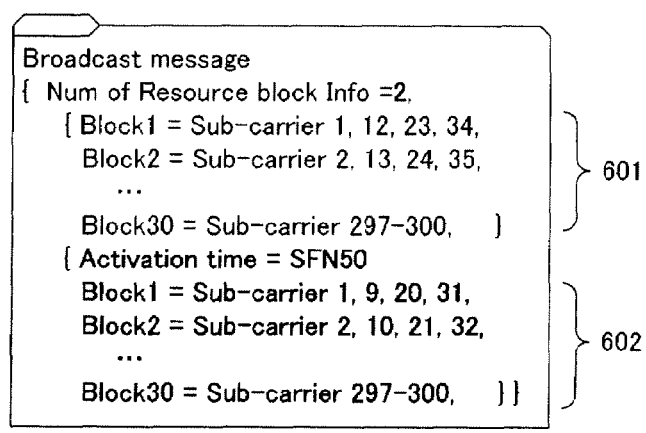
FIG. 13 shows current RRB arrangement information, new RRB arrangement information and timing information included in broadcast information.

Next, communication steps between Node B 300 shown in FIG. 10 and UE 400 shown in FIG. 11 will be described using FIG. 12. In FIG. 12, in ST501, Node B 300 transmits broadcast information including RRB arrangement information to UE 400. As shown in FIG. 13, the broadcast information includes current RRB arrangement information 601, new RRB arrangement information 602 and timing information (i.e. activation time=SFN 50).

In ST502, UE 400 receives the broadcast information from Node B 300 and holds the current RRB arrangement information, new RRB arrangement information and timing information included in the received broadcast information.

In ST503, the time specified by the timing information (i.e. activation time) has come, and so Node B 300 changes the current RRB arrangement information to new RRB arrangement information and, in ST504, the UE changes the current RRB arrangement information to new RRB arrangement information in the same way. Further, ST503 and ST504 are carried out at the time specified by the timing information at the same time.

In ST505, the CQI report value is calculated using the RRB arrangement information changed in ST504 and CQI information including the calculated CQI report value is created, and, in ST506, UE 400 transmits the CQI information to Node B 300.

In ST507, Node B 300 receives the CQI information from UE 400 and carries out scheduling based on the CQI report value included in the received CQI information, and, in ST508, Node B 300 transmits scheduling information to UE 400.

In this way, according to Embodiment 2, a UE receiving broadcast information including current RRB arrangement information, new RRB arrangement information and timing information for switching these two items of RRB arrangement information, changes the current RRB arrangement information to the new RRB arrangement information based on the timing information, and Node B also changes the current RRB arrangement information to the new RRB arrangement information at the same timing as the UE, and, consequently, Node B is able to carry out scheduling based on the RRB arrangement information currently used by the UE, so that it is possible to prevent communication cutoff even when RRB arrangement information changes.

Embodiments of the present invention have been described.

Also, although cases have been described with the above embodiment as examples where the present invention is configured by hardware. However, the present invention can also be realized by software. Further, the present invention can also be realized by combining Embodiment 1 and Embodiment 2.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further the method of circuit integration is not limited to LSI's, and implementation using dedicated circuitry or general purpose processors is also possible. After LSI manufacture, utilization of an FPGA (Field Programmable Gate Array) or a reconfigurable processor where connections and setting of circuit cells within an LSI can be reconfigured is also possible.

Further, is integrated circuit technology comes out to replace LSI's as a result of the advancement of semiconductor technology or a derivative other technology, it is naturally also possible to carry out function block integration using this technology. Application of biotechnology is also possible.

The present application is based on Japanese patent application No. 2005-321448, filed Nov. 4, 2005, the entire content of which is expressly incorporated by reference herein.

INDUSTRIAL APPLICABILITY

The wireless communication base station apparatus, wireless communication mobile station apparatus, wireless communication method and wireless communication system according to the present invention are able to prevent communication cutoff when RRB arrangement information changes, and are applicable to, for example, mobile communication systems.

The invention claimed is:

1. A wireless communication base station apparatus comprising:
- a managing section that manages arrangement information and an arrangement version as an index of the arrangement information, the arrangement information representing an arrangement of a distributed channel where frequency and time are assigned in a distributed manner and a localized channel where frequency and time are assigned in a concentrated manner;
- a broadcast information creating section that creates, every time the arrangement information changes, broadcast information including the arrangement information and the arrangement version; and
- a transmitting section that transmits the broadcast information, wherein the broadcast information creating section creates the broadcast information including one of the arrangement information and the arrangement version in an adjacent cell.

2. A wireless communication base station apparatus comprising:
- a managing section that manages arrangement information and an arrangement version as an index of the arrangement information, the arrangement information representing an arrangement of a distributed channel where frequency and time are assigned in a distributed manner and a localized channel where frequency and time are assigned in a concentrated manner;
- a broadcast information creating section that creates, every time the arrangement information changes, broadcast information including the arrangement information and the arrangement version;
- a transmitting section that transmits the broadcast information; and
- a handover commanding section that transmits, to a wireless communication mobile station apparatus under control of the wireless communication base station apparatus, a handover command message including one of the arrangement information and the arrangement version in an adjacent cell.

* * * * *